(12) United States Patent
Deter

(10) Patent No.: US 6,309,072 B1
(45) Date of Patent: Oct. 30, 2001

(54) VIDEO PROJECTION SYSTEM FOR PROJECTING MORE THAN ONE PICTURE

(75) Inventor: Christhard Deter, Gera (DE)

(73) Assignee: LDT GmbH & Co. Laser-Display-Technologie KG, Gera (DE)

(*) Notice: Subject to any disclaimer, the term of this patent is extended or adjusted under 35 U.S.C. 154(b) by 0 days.

(21) Appl. No.: 09/450,611

(22) Filed: Nov. 30, 1999

(30) Foreign Application Priority Data

Jan. 20, 1999 (DE) .............................. 199 02 110

(51) Int. Cl.[7] .......................... G03B 21/26; G03B 21/00; G02F 1/00

(52) U.S. Cl. ................. 353/31; 353/31; 353/94; 348/750; 348/757

(58) Field of Search .................. 353/30, 94, 31; 348/750, 751, 752, 754, 755, 756, 757; 349/5, 8, 9

(56) References Cited

U.S. PATENT DOCUMENTS

| | | | |
|---|---|---|---|
| 3,472,587 | * 10/1969 | Liguori | 353/35 |
| 4,297,273 | 10/1981 | Whitby | 358/60 |
| 4,297,723 | 10/1981 | Whitby | 358/60 |
| 5,090,789 | 2/1992 | Crabtree | 359/10 |
| 5,424,771 | 6/1995 | Yu | 348/203 |
| 5,485,225 | 1/1996 | Deter et al. | 348/804 |
| 5,802,222 | 9/1998 | Rash et al. | 385/1 |
| 5,822,022 | 10/2000 | Deter et al. | 348/750 |

FOREIGN PATENT DOCUMENTS

| | | |
|---|---|---|
| 43 24 848 | 3/1995 | (DE) . |
| 43 24 849 C2 | 7/1995 | (DE) . |
| 195 03 929 | 8/1996 | (DE) . |
| 195 17 356 | 11/1996 | (DE) . |
| 195 37 356 C1 | 12/1996 | (DE) . |
| 198 08 264 A1 | 11/1998 | (DE) . |

(List continued on next page.)

OTHER PUBLICATIONS

Article, Lemme, H.: Ein Traum wird wahr.In: Elektronik, vol. 14/1998, pp. 34–38 w/English Abstract.
English Abstract of DE 195 37 356 C1.
English Abstract of DE 198 08 264 A1.
English Abstract of EP 210 088 B1.
English Abstract of DE 43 24 849 C2.

* cited by examiner

Primary Examiner—Christopher E. Mahoney
Assistant Examiner—Magda Cruz
(74) Attorney, Agent, or Firm—Reed Smith LLP

(57) ABSTRACT

A video projection system for projecting more than one picture in which a light source for generating at least one light bundle, an intensity modulator and a spatial light bundle modulator, wherein they are controlled by a video signal, and at least one projection surface for displaying a determined quantity or quantities of individual pictures are arranged in the direction of light of a beam path. The video projection system contains a quantity or quantities of projectors which correspond(s) to the quantity or quantities of individual pictures, each projector having a spatial light bundle modulator, wherein they are optically connected with the light source. The light bundle is divided into a quantity or quantities of partial light bundles which correspond(s) to the quantity of projectors are arranged following the one light source, considered in the direction of the beam path, each of which partial light bundles has a partial beam path, followed in each partial beam path by an intensity modulator. The intensity modulator and the spatial light bundle modulator, are arranged in one of the partial beam paths, and are controlled by the signals of a video source.

25 Claims, 6 Drawing Sheets

FOREIGN PATENT DOCUMENTS

| | | |
|---|---|---|
| 0 210 088 B1 | 9/1990 | (EP) . |
| 0 473 343 A1 | 3/1992 | (EP) . |
| 0 522 204 A1 | 1/1993 | (EP) . |
| 0 589 179 A1 | 3/1994 | (EP) . |
| 0 731 603 A2 | 9/1996 | (EP) . |
| 8251614A | 9/1996 | (JP) . |
| 9134135A | 5/1997 | (JP) . |
| WO 96/25009 | 8/1996 | (WO) . |

VIDEO PROJECTION SYSTEM FOR PROJECTING MORE THAN ONE PICTURE

BACKGROUND OF THE INVENTION a) Field of the Invention

The invention is directed to a video projection system for projecting more than one picture in which a light source for generating at least one light bundle, means for intensity modulation and means for spatial light bundle modulation, wherein these means are controlled by a video signal, and at least one projection surface for displaying a determined quantity of individual pictures are arranged in the direction of light of a beam path.

b) Description of the Related Art

There are known projectors with light sources which can derive from two fundamental principles:

1. Projectors based on the conventional imaging principle, e.g., LCD projectors and DLP projectors. These projectors will be referred to hereinafter as "picture-imaging projectors";
2. Projectors working with light bundles which are deflected in two dimensions. These projectors are also referred to, for example, as "laser display" or "laser projectors".

The above-mentioned projectors can be designed exclusively for showing monochrome pictures or also for showing black-and-white pictures. In these cases, it is sufficient to convert the electronic picture information into an intensity modulation or brightness modulation of the light. The picture impression depends first on the adjustment of picture brightness with reference to the ambient light conditions. The maximum picture brightness is limited by the light output which is modulated by 100%. The picture impression is further determined by the level of contrast. In adjusting the contrast, the modulation amplitude is fixed; that is, the gray values of the video signal are correlated with correspondingly modulated light outputs.

If a plurality of projectors of the same type which are arranged adjacent to one another show identical pictures, it is only necessary to adjust the parameters of brightness, contrast and spectral intensity distribution of the projectors relative to one another. With four projectors for four pictures, this means that there could be 12 possible adjustments.

Further, it must be ensured that the means for picture modulation and associated controlling electronics in the projectors operate with entirely identical characteristics. Only in this way will it be achieved in practice that a plurality of projectors receiving the same video information also show the same pictures.

The degrees of freedom for adjusting the projectors are increased almost three-fold when generating color images. In the case of a color picture projector, this can be explained by the fact that three different colored monochrome systems are put together in practice: a system for the primary color red, a system for the primary color green, and a system for the primary color blue. Accordingly, there are 9 possibilities for adjusting the color effect, contrast and brightness of a picture. Therefore, with four projectors, there are already 36 degrees of freedom for adjustment! The following picture properties relevant for the human faculty of sight must be extensively identical in a plurality of projectors: contrast (light-dark ratio), gradation (channel gradation), convergence (color overlap), picture sharpness, picture composition (pixel structure), brightness (luminous density), color intensity (saturation) and color shade (hue). In particular, color differences (differences in color stimulus values) between projectors which project pictures directly adjacent to one another are determined in an extremely sensitive manner by a human observer. The objective of matching the projection characteristics of a plurality of projectors to the greatest possible extent can be achieved in practice only at considerable expense with respect to technology, cost, personnel and time.

In order to project large pictures, a plurality of individual pictures are usually combined to form a total picture. For this purpose, each individual picture is generated by a complete projector.

Arrangements comprising a plurality of LCD projectors, for example, are known. According to EP 0 731 603 A2, each of these projectors contains a white light source from which the three primary colors, red, green and blue, are filtered out. Constructions containing three light sources, each of which provides a primary color, are also known. These light sources are temperature radiators. Solutions making use of temperature radiators have substantial deficiencies. The observer of the projected picture expects to be presented with a picture of uniform brightness and color depiction. However, this cannot be realized when each projector generating an individual picture has its own light source. It cannot be expected that the brightness of the independent light sources of each projector and their color-reproducing characteristics will really be identical and that they will actually remain identical permanently.

A primary problem consists in that the projection lamps age differently and unforeseeable changes in the spectral intensity distribution occur through this process. Tests have shown that the color temperature of individual projection lamps, even of the same type and age, show substantial differences in radiating characteristics. As a result, the individual projectors will reproduce different colors for the individual picture in question. In the course of aging, the color temperatures of the individual projection lamps change very differently.

Another source for differences in the spectral intensity distribution are differences and tolerances in the supply of power to the individual light sources or cathode ray tubes of the projectors. All of these negative influences lead to a considerable waste of time and material on the part of the operator of an installation of this kind to produce and maintain a balance of brightness and color effect in the individual projectors. In practice, the picture composed of the individual images must satisfy at least modest requirements with respect to quality. The process of matching the individual projectors is very time-consuming and complicated. For example, if brightness is increased by changing the supply voltage or the supply current to a projection lamp, the color temperature also changes. This influence can only be compensated by a new color matching of the projector. When a projection lamp fails and is replaced with a new one, this process becomes still more uneconomical as the new projection lamp will differ substantially with respect to light output and color temperature from those that have already been in use for a long period of time. Accordingly, it is often necessary to replace all of the projection lamps in the system at the same time when one projection lamp fails. Again, this increases costs.

Further, It is known from EP 0 589 179 that the projection lamps (temperature radiators) in picture-imaging projectors can be replaced with laser light sources. Laser light sources have the advantage over temperature radiators that they can emit light in defined wavelengths, i.e., different laser light sources of one type emit light of exactly the same wavelength. This is a great advantage, for one, in that the spectral intensity distribution is identical in laser light sources of the same construction.

However, difficulties arise even in this case with a monochrome projection system, and increased technical expenditure is required to operate a plurality of laser light sources for the individual pictures in such a way that the total picture gives a uniform impression of brightness.

A picture-imaging laser projection system generating color pictures also needs three laser light sources in the primary colors red, green and blue for each projector. One example of this is a DLP system according to EP 0 589 179 A1 in which three laser light sources generate laser light bundles of different wavelengths. The light bundles are spatially combined and expanded to the size of a DMD array by means of optics. A projection objective images the DMD array on the projection surface.

In a multiple arrangement of these projectors, the ratios of the intensities of the three laser light sources of a projector relative to one another and the maximum degree of intensities (picture brightness) and modulation amplitude (contrast) of each of the projectors must be exactly matched to one another. Special problems are caused in this respect by expanding every laser light bundle to the size of the DMD array in order to achieve a homogeneous, uniformly strong illumination of the entire surface of the internal object planes of the individual projectors.

Although it might be assumed in this case that the defined wavelengths of the laser light sources would simplify adjustment, a considerable effort is also required in this case to balance the red-green-blue laser light sources of a plurality of projectors in such a way that all pictures have approximately the same reproduction characteristics for a color picture.

Further, projectors are known (e.g., U.S. Pat. No. 5,424,771) which work with a writing light bundle. A main advantage of these laser projectors over picture-imaging projectors consists in that a virtually parallel laser light bundle forms the picture in the line dimension, so that optical imaging of a picture subject from an object plane into an image plane is not carried out. However, the problems of adjusting identical reproduction characteristics in a plurality of projectors are only slightly improved over those described above. The main advantage operative in this respect is that projectors working with a writing light bundle do not have object planes internal to the device, so that the problem of a uniform illumination of an object plane does not arise. Projectors of this type have the further advantage of a virtually unlimited depth of focus, so that pictures are always sharp with these projectors.

However, tests have also shown that a plurality of projectors, although controlled by the same video signal, show visible differences in picture reproduction which can also only be reduced by relatively elaborate measures by the nine degrees of freedom in adjustment per projector.

The difficulty in achieving matching projection characteristics in a plurality of projectors is due particularly to the differences between the beam parameters of the laser light bundle of a plurality of identical laser light sources. These parameters are essentially the light bundle diameter, divergence, polarization state and mode structure. In this case also, these parameters can be brought into agreement for different laser light sources to an extent sufficient for maintaining an identical appearance of a plurality of pictures only by additional effort. Another problem is that the working stability of each individual laser light source must be ensured over a longer period of time.

In simulators for trucks, helicopters, aircraft and ships, pictures are projected on cylindrical or spherical surfaces in order to simulate the horizontal image angle as it would actually be seen in a real-life situation. Because of the large viewing angles required for achieving a realistic picture impression, a picture, in this case, is composed of a plurality of individual pictures coming from different projection devices.

U.S. Pat. No. 4,297,723 shows an arrangement for showing pictures in the above-mentioned manner with a projector. Three laser light bundles in red, green and blue are intensity-modulated separately for a left-hand individual picture, a right-hand individual picture and a center individual picture. The intensity-modulated light in red, green and blue of each individual picture is combined spatially by means of chromatic mirrors. Three adjacent parallel light bundles are formed, each of which contains the picture information for an individual picture. These light bundles are deflected together in two dimensions with a biaxial scanning system. The three light bundles are then deflected onto a curved projection surface by specially constructed projection optics in such a way that the three individual pictures result in a total picture. The projection of the center picture is carried out in the direction given by the scanning system. The right-hand individual picture and the left-hand individual picture are spatially separated from the center picture by deflecting mirrors. These mirrors must be adjusted very exactly to the axes of the principal projection beams in order to obtain a total picture of reasonably seamless composition. The projection angles cannot be substantially greater than 50° because of the deflection mirrors needed for dividing up the picture.

For technical reasons, it is not possible in most cases to realize a picture projection, e.g., for a horizontal viewing angle of 200°, with only one projection device.

Two (e.g., EP 0 210 088 B1), three, four, or sometimes even more projection channels (e.g., EP 0 522 204 A1 or U.S. Pat. No. 5,424,771) are required, each of which projects an individual picture, wherein the individual pictures are joined to form a total picture. For this purpose, the prior art uses as many projectors and as many light sources as required by projection channels. The arrangement of the projectors is carried out in such a way that the pictures can be placed together as required by the picture projection.

According to EP 0 522 204 A1, six projectors are located in the center of a projection dome. In this case, according to FIG. 31, six or even more independently operating red-green-blue laser light sources are used, each of which contains, in turn, independently operating laser light sources in the primary colors. A plurality of projectors are used, each of which has an independent power supply and control for the lasers.

As will be gathered from the preceding description, it is absolutely necessary, based on the present level of development, to use multiple arrangements of projectors for very large pictures, especially for projection over the entire surface area of domes. However, arrangements of this type cause disproportionate increases in cost which are brought about in particular by the expenditure on installation and maintenance for projection systems with independent light sources.

OBJECTS AND SUMMARY OF THE INVENTION

The primary object of the invention is to solve the problem of providing a video projection system for projecting more than one picture in which the individual pictures are identical with respect to the characteristics of brightness, contrast and color reproduction and which remain identical during operation.

A further object of the invention is to drastically reduce the initial costs for startup operation, ongoing operation and maintenance of multi-channel projection systems of the type mentioned above.

The invention is directed to a video projection system for projecting more than one picture in which a light source for generating at least one light bundle, means for intensity modulation and means for spatial light bundle modulation, wherein these means are controlled by a video signal, and at least one projection surface for displaying a determined quantity of individual images are arranged in the direction of light of a beam path. According to the invention, the video projection system comprises a quantity of projectors which corresponds to the quantity of individual pictures, each projector having means for spatial light bundle modulation, wherein these means are optically connected with the light source; further, means for dividing the light bundle into a quantity of partial light bundles which corresponds to the quantity of projectors are arranged following the one light source, considered in the direction of the beam path, each of which partial light bundles has a partial beam path, followed in each partial beam path by means for intensity modulation, wherein the means for intensity modulation and the means for spatial light bundle modulation, which are arranged in one of the partial beam paths, are controlled by the signals of a video source.

An advantage of the invention consists in that a plurality of projectors are separated only with respect to their spatial arrangement and/or their projection direction and/or their projection surface, but are supplied by an individual central light source.

At least one video signal is prepared for more than one projector corresponding to the type of projection arrangement and is supplied to the means for intensity modulation and/or to the means for spatial light bundle modulation, the quantity of the latter corresponding to the number of projectors.

By one video source is not meant that only one individual source is used for picture generation but rather, in particular, that a quantity of different video sources which corresponds to the quantity of projectors can be used, i.e., a video source can be associated with each of the projectors. The source can be a television transmitter or a video recorder, for example.

Further, the video information of a total picture can be divided into a quantity of video information units for individual pictures which corresponds to the quantity of projectors, wherein each projector is controlled, respectively, by this video information. In this case, the projectors can be oriented in such a way that the total picture is composed of a projection of individual pictures. In this respect, the reproduction characteristics of the projectors for the individual pictures are extensively identical. There are no differences in brightness, contrast or color caused by the light source.

There are several basic possibilities for the use of the projection system according to the invention:

1. Each of the projectors can show an identical picture or different pictures, wherein the projectors are arranged at different locations and each projector projects an individual picture on a respective projection surface. This arrangement is particularly economical when a plurality of pictures, which can also have different picture contents, are to be shown in different locations because only one individual light source is required. Accordingly, the cost for generating the required light output can be considerably reduced, especially when using laser light sources.

2. Further, each of the projectors can generate an individual picture which is a component part of a large total picture. A large total picture is composed by the individual pictures on an individual projection surface when the projectors are appropriately oriented to the projection surface. The chief advantage operative in this case is that the individual pictures are generated by projectors having the same characteristics of brightness, contrast and color effect.

3. Each of the projectors is so oriented on an individual projection surface that the different individual pictures can be superimposed on one projection surface. Accordingly, for example, color pictures can be generated with three monochrome projectors supplying pictures in the primary colors, or a stereoscopic picture impression is generated by applying the polarization method or the color method.

The means for dividing the light bundle are formed of a combination of partially transparent mirrors and/or chromatic mirrors and/or splitter cubes and/or optical gratings and/or optical polarizers. These means must have the characteristic that the light bundle proceeding from the light source is divided into partial light bundles which are guided in different partial beam paths and which are divided with respect to their intensity and/or phase position and/or polarization direction and/or wavelength. Some of these means are described more fully in the embodiment examples, wherein the person skilled in the art will also be familiar with other arrangements and combinations for the splitting of a light bundle in which the most compact possible construction is realized in a very economical manner. As a rule, additional deflecting mirrors are used to obtain easily manageable and spatially compact light paths.

The means for dividing the light bundle serve to divide the light bundle proceeding from the light source in a predetermined ratio relative to the means for intensity modulation. For the purpose of showing pictures with identical characteristics, the dividing or splitting ratio for all partial light bundles is selected so as to be identical to the quantity of projectors. If pictures of various brightness and/or with different color impressions are to be generated, the splitting ratio can also be defined differently.

Splitting is determined so as to be unchangeable with respect to time, for example, by means of partially transparent or chromatic mirrors.

A control device and adjustable means for dividing the light bundle such as those produced, for example, by Laseroptik GmbH D-30826, Garbsen, make it possible to adjust or change the splitting ratio also while showing pictures. However, the adjusted brightness function and the adjusted color impression are permanently acquired once the splitting ratio has been set.

The means for intensity modulation are identical to the means for spatial light bundle modulation in the picture-imaging projectors mentioned above under item 1. These means form an internal object plane of every projector and generate an individual picture therein. These means are realized by an LCD matrix or a DMD array or another image source which passively emits light.

The picture sources which do not emit light themselves include all means which can influence the intensity distribution of an expanded light bundle within its cross-sectional surface. For example, this also includes positive transparencies, diaphragms or shutters, light valves, but not matrixes actively generating light, e.g., in the form of diodes, transistors or miniaturized tubes.

The individual picture can be viewed directly, for example, in an LCD matrix. However, in order to obtain large pictures, the individual picture generated in the internal object plane of the projector is magnified on the projection surface by a projection objective.

It is only in picture-imaging projectors and in cases where the diameter of the partial light bundle is smaller than the size of the object plane internal to the device that a quantity of devices for expansion which corresponds to the quantity of projectors is arranged after the dividing means in the partial beam path for each partial light bundle, wherein each expansion device expands a partial light bundle to the size of the internal object plane of the respective projector. Expansion of the partial light bundles to the respective size of the internal object plane makes it possible to illuminate the latter by a partial light bundle having the same characteristics as the other partial light bundles for the other projectors.

In the laser projector mentioned above under item 2, the means for spatial light bundle modulation comprise a biaxially acting deflecting system by which the respective partial light bundle is deflected in two dimensions. This written partial light bundle generates lines in tight rows on the projection surface, these lines being perceived by the observer as a frame or picture.

Biaxial deflecting systems are, in particular, combinations of polygon mirrors for line deflection and tilting mirrors for picture or frame scanning. A biaxial deflecting system can also be realized advantageously by a two-fold arrangement of the above-mentioned means. However, a biaxially acting deflecting system can also be constructed from the means mentioned in WO 96/25009 which are controllable. It is essential in this case that a light bundle is modulated only in its radiating direction.

In projectors which work with a writing light bundle, the means for intensity modulation are, in particular, electro-optic or acousto-optic modulators. These modulators generate a brightness-modulated partial light bundle through relatively simple electrical control.

Further, the intensity modulation or amplitude modulation of the light can also be carried out according to one of the principles mentioned in WO 96/25009.

Two classes of light source are used in this invention:

In one case, the light source is a radiation source which has a spatially expanded light intensity distribution curve. These radiation sources are realized as temperature radiators, e.g., a halogen lamp or luminescent radiator, e.g., luminescent diodes.

In the second case, the light source is a radiation source which radiates a virtually parallel light bundle. According to the present state of the art, this radiation source is a laser light source, in particular.

It has been shown in video projection systems that particularly suitable laser light sources have the characteristic that the divergence of the light bundle is diffraction-limited.

The video projection system according to the invention is also particularly suitable for showing color pictures. A video projection system of this type is characterized in a first case in that there is a beam path for a light bundle containing the primary colors red, green and blue following the light source, the means for dividing are arranged in this beam path and divide the light bundle into a quantity of partial light bundles corresponding to the quantity of projectors and divide each of these partial light bundles into an additional three partial light bundles, each of which contains one of the primary colors red, green and blue and has a partial beam path, followed by means for intensity modulation arranged in every partial beam path, further, each of the three partial beam paths in which one of the partial light bundles in one of the primary colors red, green and blue is guided is assigned to one of the projectors, and the means for intensity modulation which are arranged in these three partial beam paths are controlled by a color video signal from a video source.

A video projection system for showing color pictures is characterized in a second case in that spatially separated beam paths for the light bundles in the primary colors red, green and blue follow the light source and the means for dividing the three light bundles are arranged in these three beam paths, these means dividing each of the three light bundles into a quantity of partial light bundles corresponding to the quantity of projectors, wherein each partial light bundle has a partial beam path, followed by means for intensity modulation arranged in every partial beam path, further, each of the three partial beam paths in which one of the partial light bundles in one of the primary colors red, green and blue is guided, is assigned to one of the projectors, and the means for intensity modulation which are arranged in these three partial beam paths are controlled by a color video signal from a video source.

In the latter case, the light source is either a radiation source from which the color components red, green and blue are divided into separate beam paths or the light source is formed of three radiation sources, each of which generates one of the colors red, green and blue in an independent beam path.

In order to achieve characteristics of picture reproduction that are as uniform and permanent as possible, the use of a light source which is a red-green-blue laser light source is especially advantageous within the meaning of the invention.

Temperature radiators deliver a continuous spectrum from which only the three spectral regions for the primary colors need to be filtered out. Temperature radiators always work principally with considerable energy losses, primarily in the form of heat. However, a red-green-blue laser light source delivers only three light components within a wavelength region limited to a few nanometers. The wavelengths of the laser light are based on the characteristics of a laser material and can be maintained very constant with respect to time.

The proportions of the output for each of the primary colors are adjusted in a very stable manner with respect to time by means of an electronic regulating device. For example, the white balance of the light source of a projector with respect to the daylight-equivalent standard illuminant D 65 requires output proportions of 100% for red (632 nm), 95.3% for green (532 nm) and 67.9% for blue (445 nm).

It is only in the picture-imaging projectors mentioned above under item 1 and in cases where the diameter of the partial light bundle is smaller than the size of the object plane internal to the device that a device for expansion is arranged following the dividing means in each partial beam path for every partial light bundle in the primary colors, wherein each device for expansion expands one of the partial light bundles in the primary colors to the size of the internal object plane of the respective projector.

In the two variants of the video projection system for showing color pictures, an advantageous arrangement consists in that the three partial light bundles that are associated with a projector and an individual color picture are assigned to means for superposition and the spatially combined partial light bundles for showing an individual color picture are projected on the projection surface.

In this connection, "superposition" of the partial light bundles on the projection surface does not mean that the superposition of the partial bundles must be carried out directly on the projection surface; rather, the superposition of the partial light bundles can be carried out in the area between the means for intensity modulation and the projection surface. It is essential that a combined color picture is formed on the projection surface from the different colored partial light bundles as a result of this superposition irrespective of the location of the superposition. The superposition of the different colored partial light bundles in the three partial beam paths to form an individual color picture is carried out 1) by the superposition of the three different colored partial light bundles in the primary colors for an individual picture by a color picture projector containing, in itself, three projection channels for picture reproduction which are oriented to the projection surface of the individual picture directly on this projection surface; in this case, the problem arises that it is difficult and requires elaborate adjustment to actually make the three individual pictures in the primary colors of a projection channel completely coincide on the projection surface; 2) by superposition of three different colored pictures in primary colors for an individual picture in the beam path between the means for spatial light bundle modulation and the projection surface; 3) by superposition of three different colored partial light bundles in the primary colors for an individual picture in the beam path between the means for intensity modulation and the means for spatial light bundle modulation.

Further, the quantity of color components is not limited to the three primary colors. This arrangement is only a particularly advantageous one, since, with the three primary colors, all other color stimulus values in the color triangle formed by the primary colors can be generated. However, the invention can also be realized with two colors or with three colors other than the primary colors, in which case a full-quality color picture is not formed or, with more than three colors, there is an increase in expenditure.

It is only in the picture-imaging projectors mentioned above under item 1 that the means for superposition which combine the three individual pictures in the primary colors to form an individual color picture are arranged in the three partial beam paths after the object planes internal to the device which generate individual pictures in the primary colors and which are associated with one of the projectors for an individual color picture.

On the other hand, in the laser projectors mentioned above under item 2, it is particularly advantageous that the means for superposition are arranged in the three partial beam paths after the three means for intensity modulation associated with one of the projectors, wherein the means for superposition combine the three partial light bundles in the primary colors into a common beam path and the means for spatial light bundle modulation are arranged following this.

In this case, no problems arise in superimposing the three partial light bundles in the primary colors because the spatial unification is carried out prior to the means for spatial light bundle modulation and, therefore, no convergence problems can occur on the projection surface. However, one of the above-described kinds of superposition of the different colored light bundles can also be carried out in the laser projectors, either on the projection surface itself or after the means for spatial light bundle modulation through superposition of the different colored pictures.

In the laser projectors mentioned above under item 2, the means for spatial light bundle modulation advisably contain transformation optics which reduce or increase the deflecting angle for adapting or adjusting the picture size.

Further, the video projection device can be outfitted with a light source which generates, in temporal succession, the partial light bundles in the primary colors red, green and blue. This temporal succession of the partial light bundles can also be generated by the means for dividing. This results in a time-multiplexing operating mode for showing individual color pictures, and the means for intensity modulation and the means for spatial modulation are controlled according to the video signals. These video signals are correspondingly prepared for the time-multiplexing operation. This type of image generation is advantageous particularly in picture-imaging projectors because, in this case, the expenditure on adjustment for each color channel is reduced. Further, this time-multiplexing operating mode has the general advantage that the number of component assemblies can be reduced by almost two thirds.

For many applications, it is required or advisable to separate a light source from the projectors or to set the projectors relatively far apart spatially and/or so as to be spatially flexible. For this purpose, a light-conducting fiber connection is produced in each of the partial beam paths in part of the area between the means for dividing the light bundle and the means for spatial light bundle modulation. It is important that every partial light bundle can be coupled into and out of one or more light-conducting fibers as completely as possible.

In projectors which work with a writing laser light bundle, the light-conducting fiber connection can be produced in a particularly favorable manner in the partial beam path between the means for intensity modulation and the means for spatial light bundle modulation.

However, the light-conducting fiber connection can also be carried out between the means for dividing and the means for intensity modulation.

In video projection systems which generate color pictures on the basis of the laser projectors mentioned above under item 2, it is particularly advantageous that at least a portion of the partial beam path located between the means for superposition and the means for spatial light bundle modulation is produced by a light-conducting fiber connection.

However, it is not absolutely necessary that all of the partial beam paths have a light-conducting fiber connection. It is also possible to combine light-conducting fiber connections with other optical transmission paths.

Further, the invention can also be applied advantageously for a video projection system in which two individual pictures are superposed in order to produce a three-dimensional picture impression. In particular, when using laser light sources, two suitable methods are: 1) projection of individual pictures with different polarization directions of the light bundles, because laser light sources generally deliver polarized light; and 2) projection of individual pictures with slightly different wavelengths which are nevertheless perceived by the human eye as the same color because laser light sources generally generate light having a small bandwidth.

The first method is known, for example, from DE 195 37 356 C1, in which pictures from a projector generating pictures with light polarization at right angles to one another are superimposed. In this case also, it is advantageous when only one light source is used and the two individual pictures can be generated simultaneously and independent from one another on the projection surface.

In this connection, the light source delivers light in at least two different polarization directions which is guided, in each instance, to means for intensity modulation. In this case, the means for intensity modulation are controllable by a source by means of which a superposition of pictures can be generated for three-dimensional viewing. The modulated light bundles are then projected onto the projection surface by means of independent projectors which are adapted to one another.

However, the different polarization directions can also be obtained from a light source which delivers circularly polarized light bundles in that the means for dividing the light bundle produce the two different polarization directions.

In contrast to DE 195 37 356 C1, the generation and splitting of the polarization directions is carried out in this case prior to the means for intensity modulation. This has the advantage, above all, that the individual pictures are generated for the right eye and for the left eye simultaneously. One projector is used for each individual picture so as to produce an image resolution such as that which can be achieved in comparable two-dimensional projection.

The second method is known, for example, from DE 198 08 264 A1, in which pictures from a projector generating pictures with different small-band light wavelength regions are superimposed.

According to the invention, light bundles of different wavelengths can be generated by the light source, wherein two light wavelengths have a wavelength difference of less than 80 nm.

Two partial light bundles are generated by the means for dividing the light bundle and are guided to the means for intensity modulation which are controllable by a source by means of which a superposition of pictures can be produced for "three-dimensional viewing". The modulated light bundles are then projected onto the projection surface by means of independent projectors which are adapted to one another.

In every case, the light bundles of a light source are divided into partial light bundles by the arrangement according to the invention and developments thereof. This step brings about a substantial reduction in costs compared with known arrangements.

The electronic video information is transformed by the means for intensity modulation and/or the means for spatial light bundle modulation into optical video information with which pictures are generated from a plurality of spatially independently placed projectors. Very special advantages are achieved by using laser light sources for generating the red-green-blue light bundles. The predetermined wavelengths of the laser light sources can be maintained stable over the entire life of the light source. In this way, the color reproduction characteristics in the projectors can be made unchangeable over time and identical. All of the optical components used, such as deflecting mirrors, partially transparent mirrors and chromatic mirrors, are optically passive components whose function is neither dependent on output nor changeable over time.

The video projection systems using more than one projector can be constructed in a simpler manner. A drastic reduction in the cost of operating and maintaining such video projections systems is also achieved with the system suggested according to the invention.

The invention will be described in the following with reference to the drawings.

DESCRIPTION OF THE PREFERRED EMBODIMENTS

Figure 1:
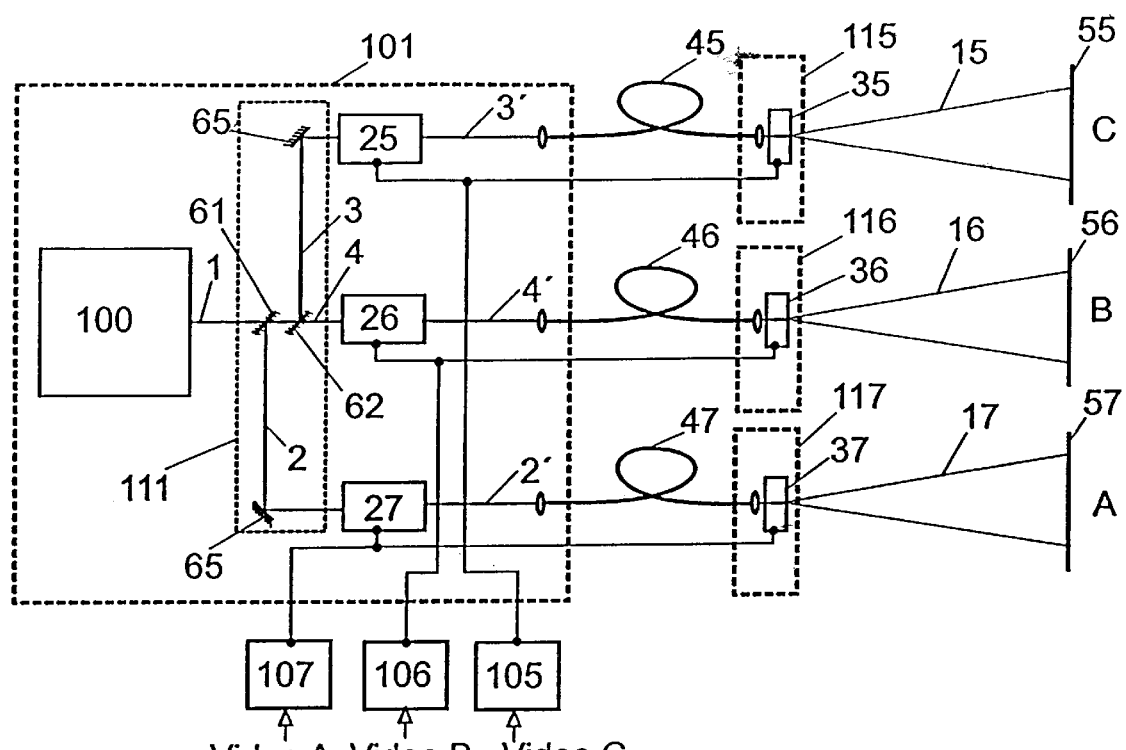
FIG. 1 shows a video projection system according to the invention for projecting three pictures which are generated by writing laser light bundles.

FIG. 1 shows a video projection system for projecting three pictures, wherein pictures A, B and C are generated by writing light bundles. The transmission of the partial light bundles 2', 3' and 4' carrying the optical signals is carried out between a multiple light source 101 which can be intensity-modulated and three projectors 115, 116 and 117 by means of light-conducting fiber connections 45, 46 and 47. The three projectors 115, 116 and 117 are oriented, respectively, to a projection surface 55, 56 and 57.

Further, there are electrical connections between the multiple light source 101 which can be intensity-modulated, the projectors 115, 116 and 117 and, respectively, an associated control electronics unit 105 for a video channel C, control electronics unit 106 for a video channel B and control electronics unit 107 for a video channel A.

By means of this solution, three pictures can be projected independent from one another with respect to direction, position and size and content of pictures. The setup locations of the projectors 115, 116 and 117 and projection surfaces 55, 56 and 57 assigned thereto can be selected relatively independent from one another. Distances of 60 meters can easily be realized between the three projectors 115,116 and 117. For this purpose, the maximum distance of the projectors 115,116 and 117 from the multiple light source 101 which can be intensity-modulated should not be much greater than 30 meters because of the optical damping of currently available light-conducting fibers which leads to intensity losses.

The multiple light source 101 which can be intensity-modulated, shown in the example according to FIG. 1, is formed of a light source 100, means 111 for dividing the light bundle 1 into three partial light bundles, and three means for intensity modulation 25, 26 and 27. The light bundle 1 exiting from the light source 100 is divided by the means 111 for dividing into three partial light bundles 2, 3 and 4 of identical intensity, i.e., each of the partial light bundles 2, 3 and 4 has ⅓ of the intensity of light bundle 1. The partial light bundles 2, 3 and 4 serve to generate an individual picture A, B and C onto the projection surfaces 55, 56 and 57.

In the example, the light source 100 is a monochromatic laser light source with a wavelength of 532 nm. In the present example, the means 111 for dividing the light bundle 1 into three partial light bundles are formed of partially transparent mirrors, a 33-% splitter mirror 61 and 50-% splitter mirror 62 which are arranged one after the other in the beam path of the light bundle 1. In this instance, the partial light bundles 2 and 3 are deflected by 90° by deflecting mirrors 65. Each of the partial light bundles 2, 3 and 4 is associated with means for intensity modulation 25, 26 and 27, respectively. In the present example, the means for intensity modulation are acousto-optic modulators. Each of the three independently operating means for intensity modulation 25, 26 and 27 receives electric signals from one of the control electronics units 105, 106 and 107, wherein these electric signals correspond to the picture information of the individual pictures to be displayed on the projection surfaces 55, 56 and 57. The electric signals for intensity modulation are obtained from video signals A, B and C.

DE 195 17 356 C1, for example, describes how the video data are processed and how the modulators can be controlled.

Considered in the direction of light, a light input end of the light-conducting fiber connections 45, 46 and 47 is arranged in an optical beam path following the means for intensity modulation 25, 26 and 27. One of the modulated partial light bundles 2', 3' and 4' is coupled into the light input ends in each instance. In the example, every light-conducting fiber connection 45, 46 and 47 is formed of coupling-in optics at the light input end and a multimode light-conducting fiber and coupling-out optics at a light outlet end of the light-conducting fibers. DE 196 16 843 A1, for example, describes how a light-conducting fiber connection of this kind can be constructed for a video projection system.

Each of the light outlet ends of the light-conducting fiber connections 45, 46 and 47 is connected with one of the projectors 115, 116 and 117. In this example, each of the projectors 115, 116 and 117 contains means for spatial light bundle modulation 35, 36 or 37. The partial light bundles emerging from the light-conducting fiber connections 45, 46 and 47 are directed to the means for spatial light bundle modulation 35, 36 and 37, respectively. The means for spatial light bundle modulation are formed in this example by a rotating polygon mirror for line deflection and a tilting mirror for frame deflection. An arrangement of this kind is described in DE 43 24 849 C2, wherein transformation optics for increasing the deflection angles of the light bundles are provided after the two deflecting mirrors. If transformation optics are required, they can also form a component part of each of the means for spatial light bundle modulation. Each of the partial light bundles 15, 16 and 17 deflected in the line direction and frame direction generates an individual picture A, B and C.

Figure 2:
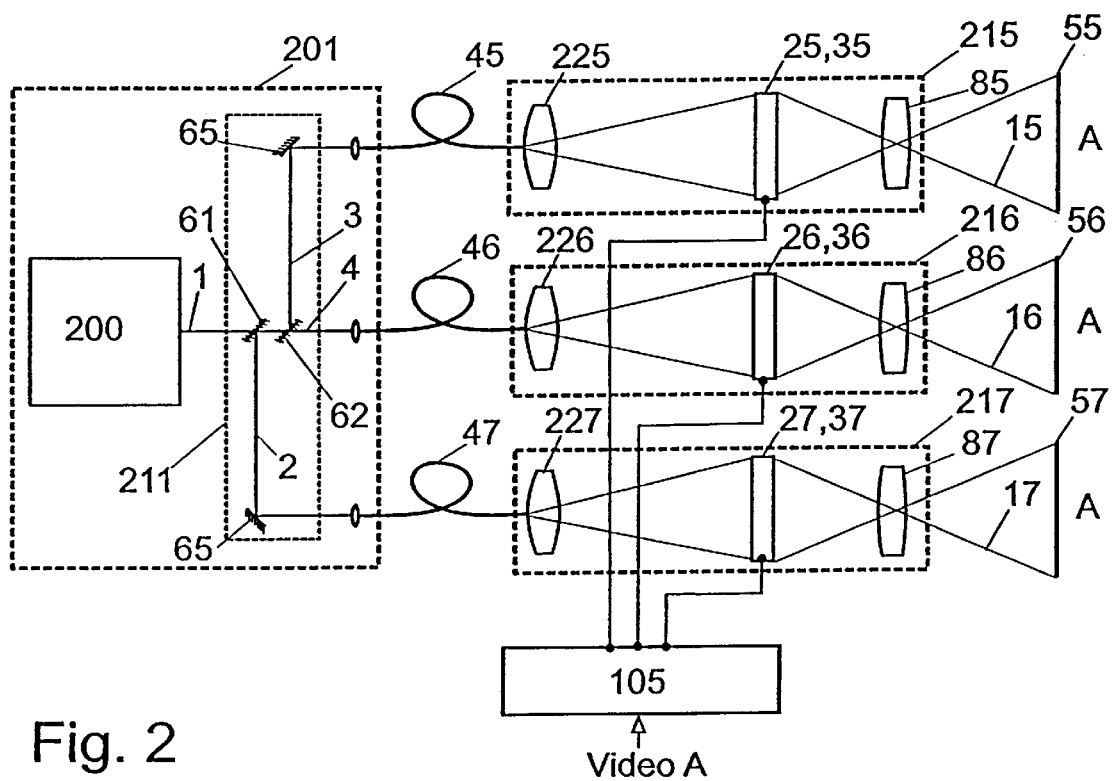
FIG. 2 shows a video projection system according to the invention for projecting three pictures which are generated by a picture-imaging projection with a laser light source and with light-conducting fiber connections.

FIG. 2 shows a video projection system for projecting three individual pictures A, B and C which are generated by LCD matrixes. Projectors operating with LCD matrixes are included in the group of picture-imaging projectors. Also, in this example, a laser light source is used as light source 200 and the light-conducting fiber connections 45, 46 and 47 are used in the optical channels. The video projection system in this case comprises the multiple light source 201 (which cannot be modulated in intensity) generating the three partial light bundles 2, 3 and 4 and three projectors 215, 216 and 217, each of which is oriented to one of the projection surfaces 55, 56 and 57. The optical connections between the multiple light source 201 and the three projectors 215, 216 and 217 are produced by the three light-conducting fiber connections 45, 46 and 47, By means of this solution, three picture projections can also be realized independent from one another with respect to direction, position, size and contents of the individual pictures.

In this connection, the placement of the projectors 215, 216 and 217 and the projection surfaces 55, 56 and 57 assigned thereto can be selected relatively independent from one another as was described with reference to FIG. 1.

In the example according to FIG. 2, the multiple light source 201 comprises only one light source 200 and the means 211 for dividing into three partial light bundles. The light bundle 1 exiting from the light source 200 is divided by the means for dividing into three partial light bundles 2, 3 and 4 of equal intensity, i.e., each of the partial light bundles 2, 3 and 4 has ⅓ of the intensity of light bundle 1. In the present example, the light source 200 is a laser light source with wavelength 532 nm. The means for dividing the light bundle 1 comprise the 33-% splitter mirror 61 and the 50-% splitter mirror 62 which are arranged one after the other in the beam path of the light bundle 1. In this instance, the partial light bundles 2, 3 and 4 are coupled into one of the light input ends of the light-conducting fiber connections 45, 46 and 47 by means of the deflecting mirrors 65 and the coupling-in optics.

In the present example, each of the light outlet ends of the light-conducting fiber connections 45, 46 and 47 is connected with one of the projectors 215, 216 and 217. In this case, each of the projectors 215, 216 and 217 contains optics for expansion 225, 226 and 227 for the partial light bundles 2, 3 and 4, the means for intensity modulation 25, 26 and 27, the means for spatial light bundle modulation 35, 36 and 37 and projection optics 85, 86 and 87. In this case, the partial light bundles 15, 16 and 17 contain, at all times, the picture information for the full size of the individual picture.

It must be stressed that, in the present instance, the means for intensity modulation 25, 26 and 27 coincide with and are identical to the associated means for spatial light bundle modulation 35, 36 or 37. These means are realized in the present example by LCD matrixes. Each LCD matrix is arranged in front of the object-side focal point of the projection optics 85, 86 and 87. The LCD matrix is controlled by the control electronics 105 in such a way that it shows the entire picture in an object plane internal to the device, which object plane is projected by means of the projection optics 85, 86 and 87 on the projection surface 55, 56 and 57. Only one control electronics unit 105 which processes a video signal A is provided in this example. Therefore, identical individual pictures are projected onto the projection surfaces 55, 56 and 57. Each individual picture is shown in a different space, for example.

The optical components for expansion 225, 226 and 227 of the partial light bundles are required so that the partial light bundles exiting from the light-conducting fibers can be expanded until the picture field of the LCD matrix can be illuminated completely and as uniformly as possible. A picture-imaging projection system which works with an expanded laser light bundle is known from EP 0 589 179, for example. In this case, a DMD array is used as means for intensity modulation and as means for spatial light bundle modulation.

Figure 3:
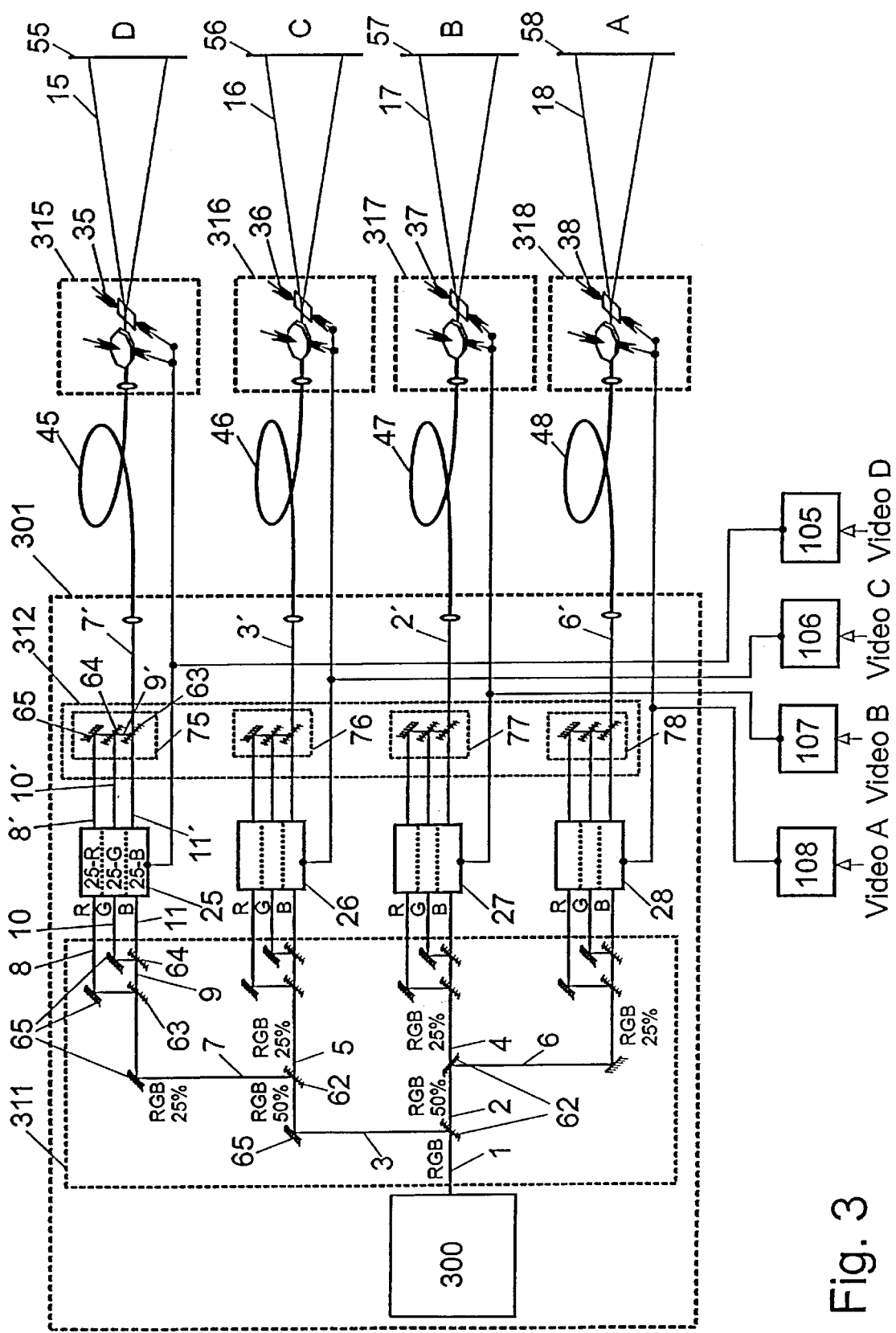
FIG. 3 shows a video projection system according to the invention for projecting four color pictures with writing light bundles from a R-G-B laser light source.

FIG. 3 shows the optical design of a video projection system for projecting four color individual pictures A, B, C and D with a multiple light source 301 which can be intensity-modulated.

A light source 300 emits a red-green-blue light bundle 1 (R-G-B light bundle). In this example, this is a red-green-blue laser light bundle. The light bundle 1 impinges on a first partially transparent mirror 62 which splits the intensity of the light bundle 2 into two partial light bundles 2 and 3, each with 50% of the intensity of the incident R-G-B light bundle 1. A second partially transparent mirror 62 which generates the partial light bundles 4 and 6, each with a 25-% redgreen-blue light proportion of the R-G-B light bundle 1, is arranged in the beam path of the partial light bundle 2. In the following, the continued beam path will be described only for the light components for the picture display in video channel D. A deflecting mirror 65 deflects the 50-% partial light bundle 3 by 90°. After this, the partial light bundle 3 strikes another partially transparent mirror 62. Partial light bundles 5 and 7 are formed, each of which has 25% of the intensity of the R-G-B light bundle 1. The 25-% partial light bundle 7 strikes a first chromatic mirror 63 which reflects a red partial light bundle 8 of the partial light bundle 7 and transmits a green and blue partial light bundle 9. The green and blue partial light bundle 9 strikes a second chromatic mirror 64 which reflects a green partial light bundle 10 and transmits the blue partial light bundle 11 into the means for intensity modulation 25. Additional deflecting mirrors 65 in the beam paths direct the green partial light bundle 10 and the red partial light bundle 9 into the means for intensity modulation 25 which comprise three individual, independent intensity modulators, one for each of the primary colors, in the present example.

The splitting of the light bundle for video channel D described herein applies analogously to video channels A, B and C. All partially transparent mirrors 62, deflecting mirrors 65 and chromatic mirrors 63 and 64 which serve to split the light bundle 1 are combined in means 311 for dividing the R-G-B light bundle 1 into four partial light bundles.

Means for intensity modulation 25-R, 25-G and 25-B, respectively, follow the red partial light bundle 8, the green partial light bundle 10 and the blue partial light bundle 11, respectively, wherein the means for intensity modulation 25-R can be controlled by a red modulation signal, means for intensity modulation 25-G can be controlled by a green modulation signal, and means for intensity modulation 25-B can be controlled by a blue modulation signal.

The means for intensity modulation for video channels A, B and C are constructed analogously. Following the means for intensity modulation 25, means for superposition 65 are arranged in the three partial beam paths for the primary colors. A deflecting mirror 65 is arranged in the partial beam path for the intensity-modulated red partial light bundle 8'. Following the latter in this partial beam path is a chromatic mirror 64 which transmits the intensity-modulated red partial light bundle 8' and reflects the intensity-modulated green partial light bundle 10'. A chromatic mirror 63 arranged in the partial beam path of the intensity-modulated red and green partial light bundle 9' reflects the intensity-modulated red and green partial light bundle 9' and transmits the intensity-modulated blue partial light bundle 11'. Following the chromatic mirror 63, a collinear brightness- and color-modulated R-G-B partial light bundle 7' is obtained which has a brightness and color effect corresponding to the information contained in the color video signal Video D. The intensity modulation (through the means for intensity modulation 26, 27 and 28) of the light components and the combining (through the means for superposition 76, 77 and 78) to form the collinear brightness-modulated and color-modulated partial light bundles 2', 3' and 6' are carried out in a corresponding manner for every video channel A, B and C. All deflecting mirrors 65 and chromatic mirrors 63 and 64 serving for the spatial superposition of the partial light bundles 8', 9', 10' and 11' of video channel D are combined in means for three-fold superposition 75. The means for three-fold superposition 75, 76, 77 and 78 for video channels D, C, B and A form a component group for superposition 312 of the modulated partial light bundles in the primary colors for the four projectors.

It should be noted at this point that the means 311 for dividing and/or the means for intensity modulation 25, 26, 27 and 28 and/or the component group for superposition 312 are arranged on a carrier with the four means for three-fold superposition 75, 76, 77 and 78. Construction can be carried out by means of conventional optical components or by means of new integrated-optics and microoptics components. DE 195 03 929 A1 describes many variants in which integrated-optics and microoptics solutions can be put into practice.

Four R-G-B partial light bundles 2', 3', 6' and 7', each with impressed brightness and color information for further processing corresponding to the respective signal video D, C, B or A, are present at the output side of the component group for superposition 312. For this purpose, all light bundles are generated from one light source 300. The R-G-B partial light bundles 2', 3', 6' and 7' are coupled into a light-conducting fiber by means of an achromat, each light-conducting fiber producing a light-conducting fiber connection 45, 46, 47 and 48 between the multiple light source 301 which can be intensity-modulated and four projectors 315, 316, 317 and 318.

Each of the projectors 315, 316, 317 and 318 contains means for spatial light bundle modulation 35, 36, 37 and 38 which, in the present example, is a biaxial deflection system comprising a polygon mirror and a tilting mirror. The brightness-modulated and color-modulated light bundle exiting from the light-conducting fibers is directed by means of light bundle-shaping optics to a polygon mirror for line deflection and then to a tilting mirror for frame deflection. These component groups are indicated schematically in FIG. 3. The polygon mirrors and the tilting mirrors are connected by electrical lines with the respective control devices 105, 106, 107, 108. It will be described hereinafter with reference to FIG. 7 how the processing of the incoming signals Video A, Video B, Video C and Video D is carried out.

Figure 4:
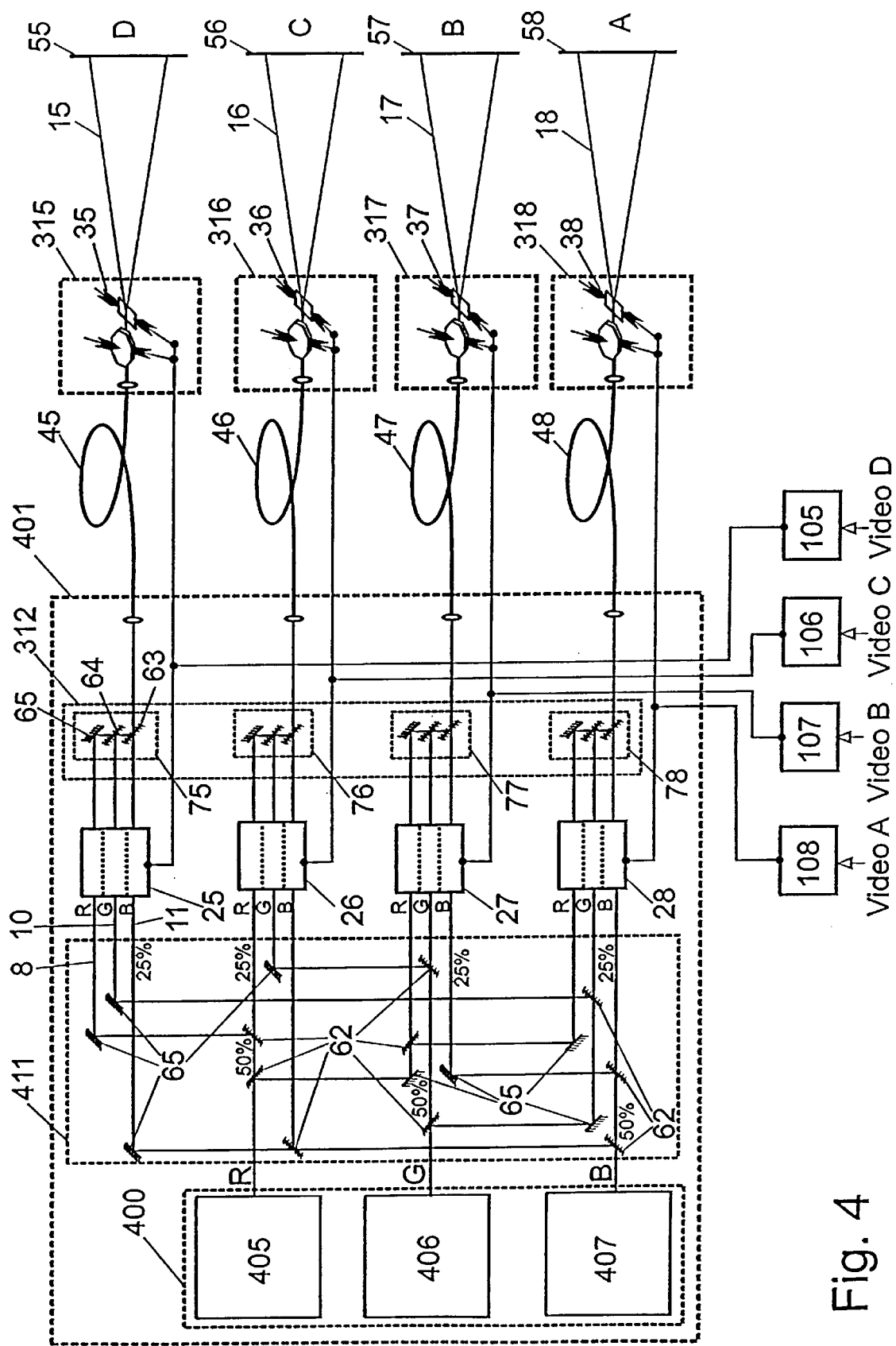
FIG. 4 shows a video projection system according to the invention for projecting four color pictures with writing light bundles from a red laser light source, a green laser light source and a blue laser light source.

FIG. 4 shows a video projection system for projecting more than one picture such as is shown in principle in FIG. 3. However, in this example, a multiple light source 401 which can be intensity-modulated has three laser light sources 405, 406 and 407 and means 411 for four-way splitting of the respective light bundle into the primary colors red, green and blue. This differs from FIG. 3 in that laser light source 405 is provided for red, laser light source 406 is provided for green, and laser light source 407 is provided for blue. In this case, the three primary colors are in separate beam paths. Therefore, no chromatic mirrors are required for splitting into the primary colors. The light bundle is divided with respect to intensity in this instance by means of the 50-% partially transparent mirrors 62 and the deflecting mirrors 65 as in FIG. 3.

In this case, 17 mirrors are used; the solution according to FIG. 3 requires 22 mirrors which, in some cases, is comparatively costly because they must divide the three primary colors.

The video projection system is constructed after the means 411 for dividing, considered in the direction of light, exactly as described in the embodiment example according to FIG. 3.

Figure 5:
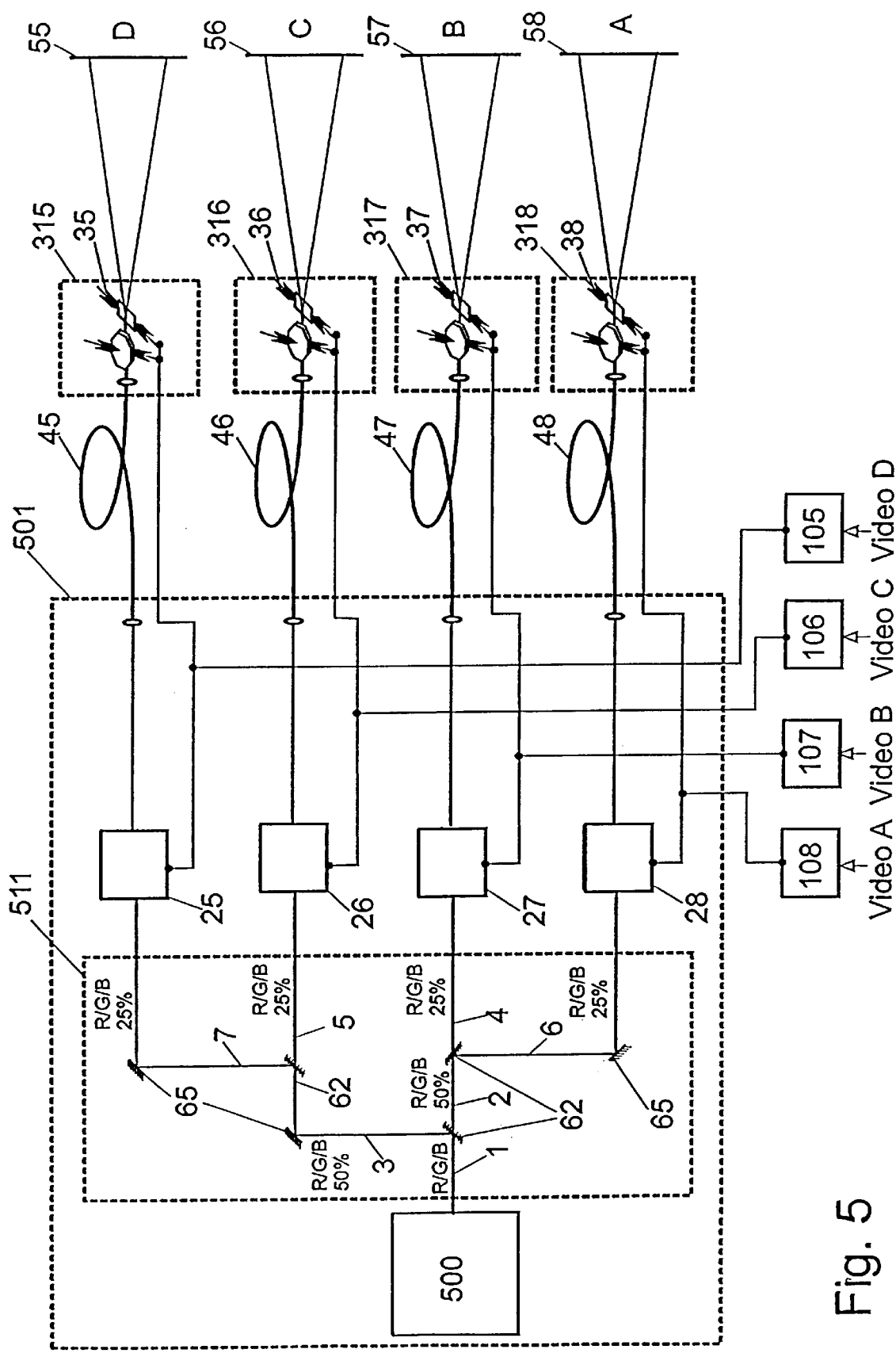
FIG. 5 shows a video projection system according to the invention for projecting four color pictures by time-multiplexing projection.

FIG. 5 shows a video projection system for projecting more than one picture in which the three primary colors are fed successively with respect to time to the means for intensity modulation 25, 26, 27 and 28. A laser light source 500 is the radiation source of a multiple light source 501 which can be intensity-modulated and generates light components in red, green and blue successively in time. The means for intensity modulation 25, 26, 27 and 28 are controlled in time-multiplexing operation depending on the present video signal A, B, C and D and on the signals for synchronization which are obtained from the means 35, 36, 37 and 38 for deflecting the R-G-B partial light bundles.

In this case, the means 511 for the four-way division of the light bundle comprise only three partially transparent mirrors 62 and three deflecting mirrors 65. The rest of the reference numbers designate the same component groups as in FIG. 3.

Figure 6:
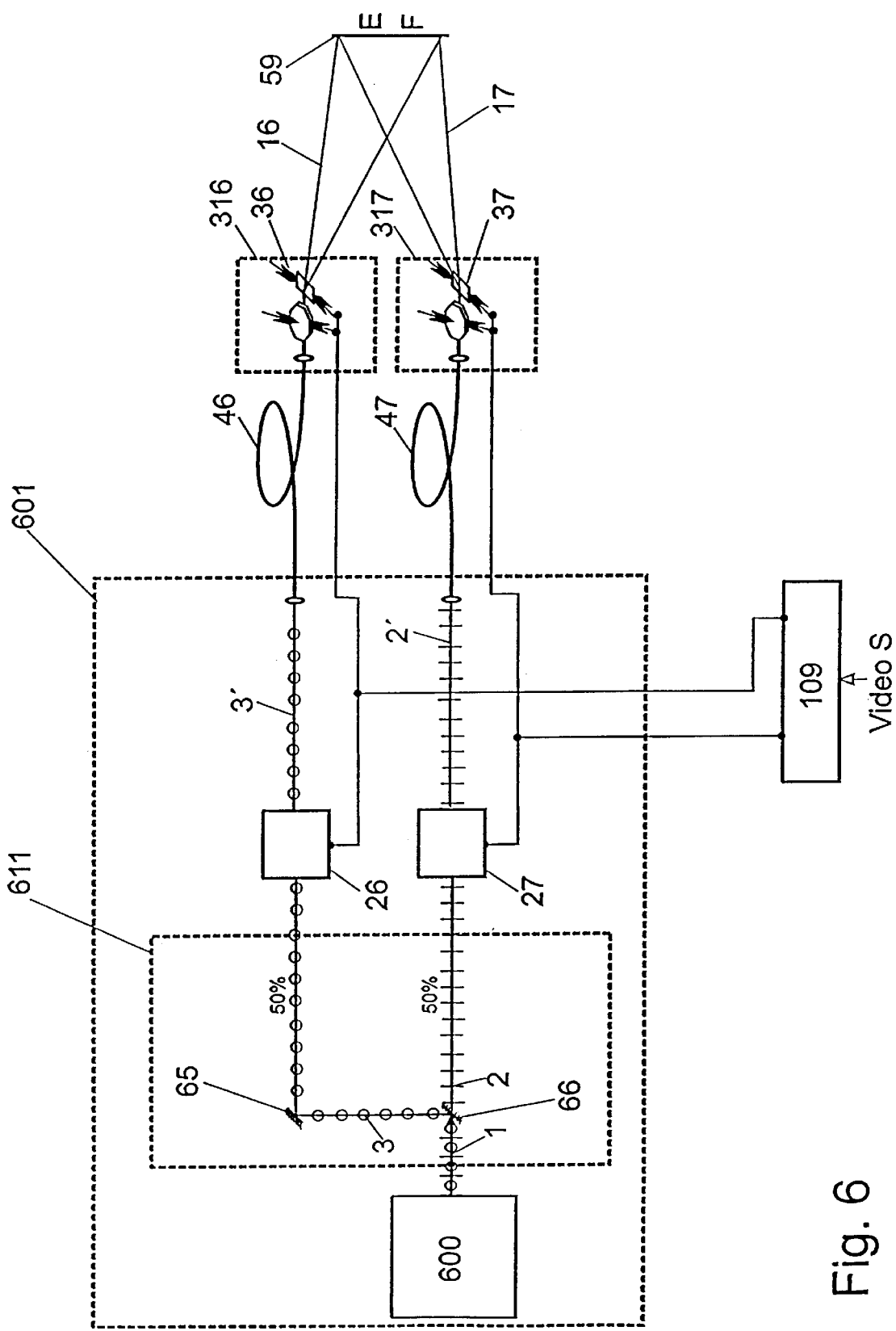
FIG. 6 shows a video projection system according to the invention for projecting pictures which provide a three-dimensional picture impression.

The features of the invention also make it possible to build a video projection system for projecting pictures which provide a three-dimensional picture impression. A similar arrangement is known, for example, from EP 0 473 343 A1, although only one projector is used therein. FIG. 6 shows, by way of example, a video projection for a monochrome stereo picture display with two projectors 316 and 317 in which an individual picture E with light in a vertical polarization direction and an individual picture F with light in a horizontal polarization direction are superimposed on a projection surface 59. For three-dimensional viewing, the observer wears spectacles with polarization filters which, respectively, filter out the light components of one of the individual pictures in one of the observer's eyes.

The video projection system in this case comprises a light source 600 generating light in one wavelength, but with two polarization directions at a right angle to one another. Together with means for intensity modulation 26 and 27, the light source 600 and means 611 for dividing the light bundle 1 form a multiple light source 601 which can be intensity-modulated. A beam splitter 66 separates the vertically polarized light components from the horizontally polarized light components. The splitting ratio of the light bundle 1 is 50%. One of the partial light bundles 2 and 3 is supplied to one of the means for intensity modulation 26 or 27 after the means 611 for dividing. The means for intensity modulation 26 and 27 are controlled by a control electronics unit 109 which controls the means for intensity modulation 26 and 27 from a signal Video S. The rest of the reference numbers designate component groups whose interaction was already described with reference to FIG. 3. A combination of video projection systems according to FIG. 6 with those described in FIG. 3 or FIG. 4 enables three-dimensional display of color pictures.

Figure 7:
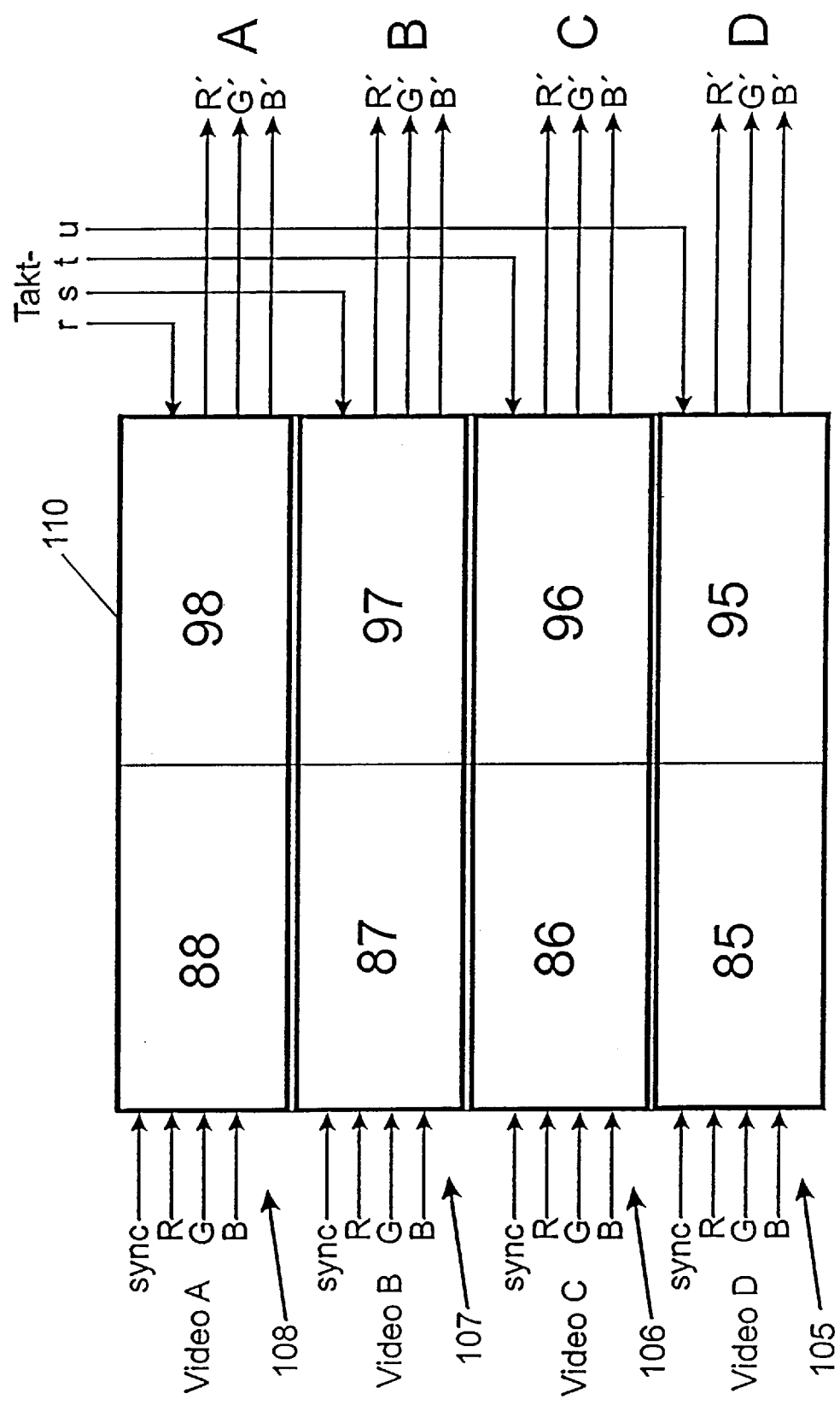
FIG. 7 shows a control device for a video projection system according to the invention for projecting more than one picture.

FIG. 7 shows a four-channel picture storage 110 such as that applied, for example, in an arrangement according to FIG. 3 or FIG. 4 when four different individual color pictures are to be shown. On the input side, the video sources are connected with input sectors 85, 86, 87 and 88 of a picture storage 110 by their respective signals Video A, B, C and D as R-G-B color signals and the signals for synchronization sync. On the output side, four-times R'-G-'B' color signals are taken off from output sectors 95, 96, 97 and 98. The synchronization on the output side is carried out by means of facet clock signals Takt r, s, t and u which are obtained from the rotational position of the corresponding polygon mirrors in the deflection means. One of the output sectors 95, 96, 97 or 98 is associated with the input sectors 85, 86, 87 and 88 in each instance. The input sector 85 and the output sector 86 are a component part of the control electronics unit 105. The other sectors are associated with the control electronics units 106, 107 and 108, respectively.

While the foregoing description and drawings represent the preferred embodiments of the present invention, it will be obvious to those skilled in the art that various changes and modifications may be made therein without departing from the true spirit and scope of the present invention.

What is claimed is:

1. A video projection system for projecting more than one picture comprising:
   a light source for generating at least one light bundle;
   means for intensity modulation and means for spatial light bundle modulation, said means being controlled by a video signal; and
   at least one projection surface for showing a determined quantity or quantities of individual pictures, said elements being arranged in the direction of light of a beam path;
   said video projection system further comprising a quantity or quantities of projectors which correspond(s) to the quantity or quantities of individual pictures;
   each said projector having means for spatial light bundle modulation, wherein these means are optically connected with the light source;
   means for dividing the light bundle into a quantity or quantities of partial light bundles which correspond(s) to the quantity of projectors being arranged following said light source, considered in the direction of the beam path;
   each of said partial light bundles having a partial beam path, followed in each partial beam path by means for intensity modulation;
   said means for intensity modulation and said means for spatial light bundle modulation, which are arranged in one of the partial beam paths, being controlled by signals of a video source.

2. The video projection system according to claim 1, wherein said means for dividing the light bundle are formed of at least one of a group consisting of partially transparent mirrors, chromatic mirrors, splitter cubes, optical gratings and optical polarizers, wherein the partial light bundles are divided with respect to at least one of intensity, phase position, polarization direction and wavelength.

3. The video projection system according to claim 1, wherein said means for intensity modulation are identical to said means for spatial light bundle modulation, and wherein these means generate an individual picture in an internal object plane of every projector, and wherein these means are realized by an LCD matrix or a DMD array or another image source which passively emits light.

4. The video projection system according to claim 3, wherein the individual picture generated in the internal object plane of the projector is imaged on the projection surface by a projection objective.

5. The video projection system according to claim 3, wherein a quantity or quantities of devices for expansion which correspond(s) to the quantity of projectors is/are arranged after the dividing means in the partial beam path for each partial light bundle, wherein each expansion device expands a partial light bundle to the size of the internal object plane of the respective projector.

6. The video projection system according to claim 5, wherein the light source is a red-green-blue laser light source, and wherein a device for expansion is arranged following the dividing means in each partial beam path for every partial light bungle in the primary colors.

7. The video projection system according to claim 3, wherein the three modulated partial light bundles in the primary colors that are associated with a projector are guided to means for superposition and the spatially combined partial light bundles for showing an individual color are projected on the projection surface, and wherein the means for superposition which combine the three individual pictures in the primary colors to form an individual color picture are arranged in the three partial beam paths after the object planes internal to the device which generate individual pictures in the primary colors and which are associated with one of the projectors.

8. The video projection system according to claim 1, wherein the means for spatial light bundle modulation comprise a biaxially acting deflecting system by which the respective partial light bundle is deflected in two dimensions and an individual picture is formed on the projection surface.

9. The video projection system according to claim 8, wherein the biaxial deflecting system is formed of a polygon mirror for line deflection and a tilting mirror for frame deflection or individually comprises a two-fold arrangement of the above-mentioned means.

10. The video projection system according to claim 8, wherein the means for intensity modulation are an electro-optic modulator or an acousto-optic modulator.

11. The video projection system according to claim 8, wherein the means for spatial light bundle modulation contain transformation optics which reduce or increase the deflecting angle.

12. The video projection system according to claim 8, wherein at least a portion of the partial beam path located between the means for intensity modulation and the means for spatial light bundle modulation is produced by a light-conducting fiber connection.

13. The video projection system according to claim 1, wherein the light source is a radiation source which has a spatially expanded light intensity distribution curve, in the manner of a temperature radiator or luminescent radiator.

14. The video projection system according to claim 1, wherein the light source is a radiation source which radiates a collinear light bundle, and wherein the radiation source is a laser light source having the characteristic that the divergence of the light bundle is diffraction-limited.

15. The video projection system according to claim 1, wherein there is a beam path for a light bundle containing the primary colors red, green and blue following the light source, said means for dividing are arranged in this beam path and divide the light bundle into a quantity or quantities of partial light bundles corresponding to the quantity of projectors and divide each of these partial light bundles into an additional three partial light bundles, each of which contains one of the primary colors red, green and blue and has a partial beam path, followed by means for intensity modulation arranged in every partial beam path, further, each of the three partial beam paths in which one of the partial light bundles in one of the primary colors red, green and blue is guided is assigned to one of the projectors, and said means for intensity modulation which are arranged in these three partial beam paths are controlled by a color video signal from a video source.

16. The video projection system according to claim 15, wherein the three modulated partial light bundles in the primary colors that are associated with a projector are guided to means for superposition and the spatially combined partial light bundles for showing an individual color picture are projected on the projection surface.

17. The video projection system according to claim 16, wherein the means for superposition are arranged in the three partial beam paths after the three means for intensity modulation associated with one of the projectors, wherein the means for superposition unite the three partial light bundles in the primary colors in a common beam path and the means for spatial light bundle modulation are arranged following this.

18. The video projection system according to claim 17, wherein at least a portion of the partial beam path located between the means for superposition and the means for spatial light bundle modulation is produced by a light-conducting fiber connection.

19. The video projection system according to claim 1, wherein spatially separated beam paths for the light bundles (R, G, B) in the primary colors red, green and blue follow the light source, and said means for dividing the three light bundles (R, G, B) are arranged in these beam paths, these means dividing each of the three light bundles into a quantity or quantities of partial light bundles corresponding to the quantity of projectors, wherein each partial light bundle has a partial beam path, followed by means for intensity modulation arranged in every partial beam path, further, each of the three partial beams paths in which one of the partial light bundles in one of the primary colors red, green and blue is guided, is assigned to one of the projectors, and the means for intensity modulation which are arranged in these partial beam paths are controlled by a color video signal from a video source.

20. The video projection system according to claim 19, wherein the light source is a radiation source from which the color components red, green and blue are divided into separate beam paths or the light source is formed of three radiation sources, each of which generates one of the colors red, green and blue in an independent beam path.

21. The video projection system according to claim 1, wherein the light source is a red-green-blue laser light source.

22. The video projection system according to claim 1, wherein partial light bundles in the primary colors red, green and blue are generated in temporal succession in a partial beam path by the light source and/or the means for dividing, and the means for spatial light bundle modulation are controlled by signals of a color video source which is prepared for time-multiplexing operation.

23. The video projection system according to claim 1, wherein at least a portion of the partial beam path located between the means for dividing the light bundle and the means for spatial light bundle modulation is produced by a light-conducting fiber connection.

24. The video projection system according to claim 1, wherein a light bundle having more than one polarization direction is generated by the light source, and the means for dividing generate partial light bundles with different polarization directions, each of which partial light bundle has a partial beam path.

25. The video projection system according to claim 1, wherein light bundles whose wavelength difference is less than 80 nm are generated by the light source, and the means of dividing generate partial light bundles having the different wavelengths, each of which partial light bundles has a partial beam path.

* * * * *